United States Patent [19]
Gold

[11] Patent Number: 4,962,601
[45] Date of Patent: Oct. 16, 1990

[54] DRAINAGE GUIDE FOR AUTOMOBILE WINDOW

[76] Inventor: Peter N. Gold, 465 North Wood Rd., Rockville Centre, N.Y. 11570

[21] Appl. No.: 419,888

[22] Filed: Oct. 11, 1989

[51] Int. Cl.$^5$ .............................................. E05F 11/38
[52] U.S. Cl. ...................................... 49/374; 49/377; 49/408; 49/476; 52/790; 296/154
[58] Field of Search ................ 49/374, 375, 377, 476, 49/502, 408; 52/790; 296/208, 154

[56] References Cited

U.S. PATENT DOCUMENTS

| | | | |
|---|---|---|---|
| 868,413 | 10/1907 | Cramer | 49/408 |
| 1,911,697 | 5/1933 | Levan | 49/377 |
| 1,954,268 | 4/1934 | Simpson | 49/377 |
| 3,553,913 | 1/1971 | Eisenberg | 52/790 X |
| 4,663,901 | 5/1987 | Ichinohe | 49/375 X |
| 4,669,241 | 6/1987 | Kelly | 52/790 X |
| 4,776,132 | 10/1988 | Gold | 49/375 |

FOREIGN PATENT DOCUMENTS 0209423  1/1987  European Pat. Off. ............ 296/154

*Primary Examiner*—Gary L. Smith
*Assistant Examiner*—Jerry Redman
*Attorney, Agent, or Firm*—Collard, Roe & Galgano

[57] ABSTRACT

The present invention relates to a drainage guide assembly for directing the flow of water that gets into the outside part of the door of an automobile around the auto glass window. The guide comprises a sloping channel gutter affixed to the outside of the window and positioned below the belt line sill of the window. The gutter is an elastomeric material extruded onto the glass window.

9 Claims, 1 Drawing Sheet

DRAINAGE GUIDE FOR AUTOMOBILE WINDOW

BACKGROUND OF THE INVENTION

1. Field of the Invention

The present invention relates to a drainage guide assembly for directing the flow of the water that gets into the outside part of the door of an automobile around the auto window. The guide comprises a sloping channel affixed to the outside of the window and positioned below the belt line sill of the window.

2. The Prior Art

Various kinds of devices and assemblies are known for mounting glass window panels in automobile doors, to permit the raising and lowering of the window by a mechanism mounted within the automobile door.

For example, the applicant's U.S. Pat. No. 4,811,519 discloses an H-shaped element channel that receives the window panel in the upper U-shaped part and receives the sash element of a window regulator mechanism in the U-shaped lower part.

The applicant's U.S. Pat. No. 4,776,132 discloses an assembly for mounting a glass window panel within an automobile door for raising and lowering the window. The glass panel has an end undercut onto which is placed a plastic buffer cap and around which are placed primary and secondary locking tabs that hold the panel to angle member for resting within a follower channel. This patent shows how anchors holes in the angle member can be used to permit the bolting of the window to the angle member to further secure the atachment thereto.

A major problem with many vehicle door window system is that vehicle door glass does not have any means to guide accumulated rain water that gravitates to the bottom of the vehicle glass, and then falls directly onto the top of the door window operators, electrical motors, as well as the interior door panel of the vehicle.

SUMMARY OF THE INVENTION

It is an object of the invention to provide a drainage guide system for a vehicle window contained within a vehicle door, for directing the flow of water along the surface of the vehicle glass panel window, so as to minimize the amount of water that freely flows within the vehicle door, in order to prevent contact between the water and any mechanical or electrical systems within the door that would be damage by the water.

The above object is accomplished in accordance with the present invention by providing a drainage guide for the direction of accumulated water away from the major portion of the vehicle door interior to a specific location without the use of any add on channels, by applying a door glass elastomeric water drip gutter extrusion directly to the outside of a vehicle door glass. The extrusion is formed and applied simultaneously to one side of the vehicle door glass, and all of this being done while the elastomeric gutter extrusion is applied in an un-cured state of elasticity.

The drainage guide of the invention is independent from any assembly for mounting the glass window panel within the vehicle door. More particularly, the present invention is directed to a drainage guide for a vehicle window panel positioned for vertical movement within the door of the vehicle comprising a vehicle glass window panel; a water drip gutter adhesively affixed to said window panel outside window surface for guttering water that collects and passes below the belt line of a vehicle door cavity, within said cavity for the useful function of directing the movement of said water to a lower corner of the window panel; said gutter comprises an elastomeric material extruded onto said outside window surface; and said elastomeric material being extruded onto said outside window surface and being applied prior to said glass panel being installed into said vehicle door cavity and/or said elastomeric material extruded onto said outside surface after said window panel has been installed into said vehicle door cavity.

The present invention has the advantage of providing a simple, inexpensive and effective drainage guide for protecting the electrical and mechanical compomnents on the inside of a vehicle door from water that drops below the windown sill inside this door.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

In the drawing wherein similar reference characters denote similar elements throughout the several views.

DETAILED DESCRIPTION OF THE PREFERRD EMBODIMENTS

Figure 1:
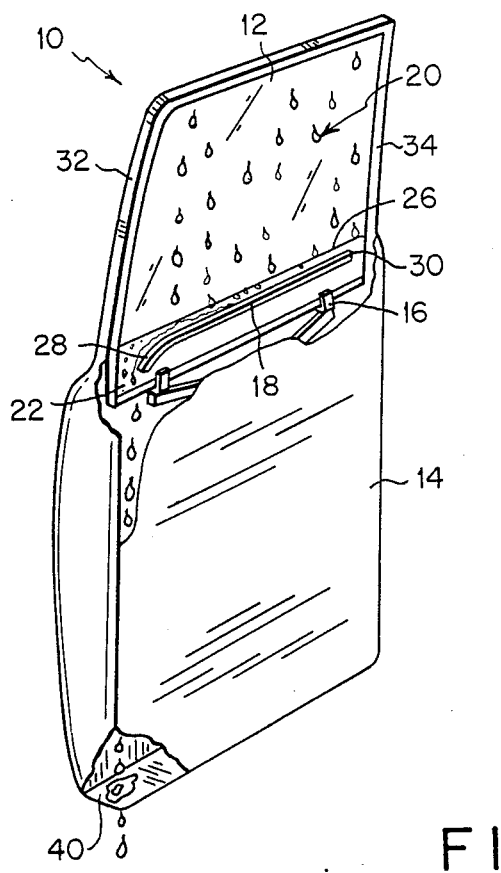
FIG. 1 shows a perspective view of the drainage guide for a vehicle window according to the present invention.

FIG. 1 shows a perspective view of a drainage guide 10 for a vehicle glass window panel 12 positioned for vertical movement within the door 14 of the vehicle. The drainage guide is an assembly which includes the vehicle glass window panel 12, a mounting means 16 shown to be a pair of clips, for holding and positioning the window panel 12 during the vertical movement thereof. This vertical movement is effected by any conventional mechanism known to those skilled in the art, and shown and described in the above noted U.S. Pat. Nos. 4,776,132 and 4,811,519. The drainage guide also includes a water drip gutter 18 affixed to the window for catching water 20 that gets within the door 14 of the vehicle and for directing the movement of the water 20 to a lower corner 22 of the window panel.

Mounting means 16 can be two spaced apart U-shaped brackets, as shown and described in applicant's copending U.S. patent application Ser. No. 389,175 filed Aug. 24, 1989.

The vehicle door 14 has a belt line sill 26. The gutter is affixed to the window panel at a position below the belt line sill 26 and above the mounting means 16. The sill 26 represents the lowest visible line on the window panel 12, when the panel is raised to its uppermost vertical position, so as to close the window. Thus, that part of the window panel below the sill is not visible. Therefore, gutter 18 would not be seen. The gutter 18 has two ends 28 and 30, with one end being higher than the other lower end. This will cause the water to flow downwardly from the higher end to the lower end.

The gutter 18, in one embodiment, has the higher end near the front 32 of the window panel 12, and the gutter slopes downwardly to a lower end near the rear 34 of the window panel.

In another embodiment, as shown in FIG. 1 the gutter has a higher end near the rear 34 of the window panel 12, and the gutter slopes downwardly to a lower end near the front 32 of the window panel.

Figure 2:
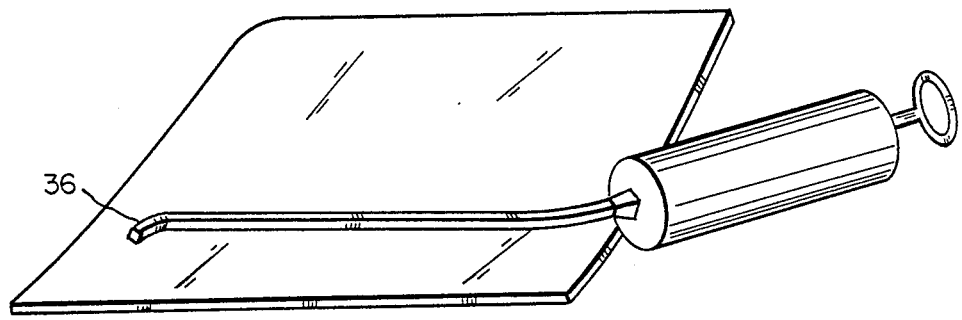
FIG. 2 shows the application of the drainage guide gutter to a vehicle window, such that the gutter has a flat water carrying surface.

As shown in FIG. 2, the gutter comprises a channel with a flat bottom surface 36 for catching the water and for directing the flow of the water. Thus surface 36 is a flat water carrying surface.

Figure 3:
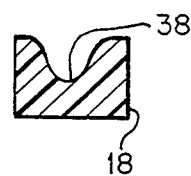
FIG. 3 shows an end view of the gutter having a concave upward water carrying surface.

As shown in FIG. 3, the gutter 18 comprises a channel with a concave upward surface 38 for catching the water and for directing the flow of the water which it is carrying.

The gutter is comprised of an elastomeric material which as shown in FIG. 2, is extruded onto the glass windown in an uncured state. Generally this occurs by utilizing a conventional extrusion gun that forces the uncured elastomeric sealant through a configured nozzle onto the outside portion of the vehicle window glass panel below the belt line sill. This elastomeric sealant can be any of the conventionally utilized and know materials that will firmly adhere to a glass surface for use as the sealant in a water containing environment. The glass window panel 12 is a conventional glass window material, and is usually automobile safetly plate glass which is comprised of two plates of glass with a thermoplastic layer sealed between to produce the safety plate laminated glass that is conventional in the art. The attachment means 16 which are used for mounting the glass window panel are also conventional; and it is to be understood that any other form of automobile window mounting means can be utilized in place of the two clips which are shown merely for illustration purposes.

The term "vehicle" is understood to means preferably an automobile; however any other type of motor vehicle that has windows which are capable of being raised and lowered, are included within the term "vehicle", such as trucks, vans, or buses.

The drainage guide according to the present invention would be utilized as follows. After the gutter elastomeric material has been applied to the glass window panel and firmly dried thereto, the window would be inserted into the door compartment of the vehicle. Alternatively the elastomeric material could be extruded onto the outside surface after the window panel had been installed into the vehicle door cavity. The window would be raised to its maximum vertical extent so as to produce an essentially water tight arrangement for protecting the passengers, and the inside of the vehicle from water which may be applied to the vehicle. FIG. 1 shows that even with the window raised to the maximum vertical extent possible, the gutter 18 would not be visible to anyone observing the window 12. Water, either in the form of rain, or possibly water applied to the vehicle during a car washing operation, would run down the window to the sill belt line. Some of this water would be deflected by the sill covering to a lower part outside of the vehicle door. However, some of the water is able to seep between the sill covering and the window, such that it would gravitate down to the gutter 18. Because the gutter is arranged with one end 28 either higher than or lower than the other end 30, this trapped water will flow from the higher end to the lower end. As shown in FIG. 1, end 30 is higher than end 28, such that the water being collected will flow to end 28 which is at the front end of the window 12, and will drip down to a disposal site at the bottom of the car door. At this point the water collected at the bottom of the car door will exit through an appropriately provided exit orifice 40, and out onto the ground below the vehicle. Having gutter 18 located between the belt line 26 and mounting means 16 assures that the water is trapped and prevented from coming contact with mechanical or electrical components of the vehicle which may be housed within the inside of the door 14, as in conventional and well known in the art. In other words the gutter 18 prevents corrosion and damage to mechanical and electrical parts of the vehicle, and thereby prolongs the life of these mechanical or electrical components, such that repair or reconstruction of these components and of the vehicle door is thereby unnecessary.

While only one embodiment of the present invention has been shown and described, it is to be understood that many changes and modifications may be made thereunto without departing from the spirit and scope of the invention as defined in the appended claims.

What is claimed is:

1. A drainage guide for a vehicle window panel positioned for vertical movement within a door of the vehicle, said vehicle door having a belt line seal, comprising:
   a vehicle glass window panel;
   a water drip gutter adhesively afffixed to said window panel outside outside window surface for guttering water that collects and passes below the belt line sill of a vehicle door cavity, within said cavity for the useful function of directing the movement of said water to a lower corner of the window panel;
   said gutter comprises an elastomeric material extruded onto aid outside window surface;
   said elastomeric material being extruded onto said outside window surface and being applied prior to said glass panel being installed into said vehicle door cavity or said elastomeric material extruded onto said outside surface after said window panel has been installed into said vehicle door cavity;
   mounting means attached to said vehicle window panel for positioning said window panel during vertical movement; and
   said gutter being affixed to said window panel at a position below said belt sill and above said mounting means said gutter being independent from any means for mounting the glass window panel within the vehicle door.

2. The drainage guide of claim 1, wherein said mounting means comprises two spaced apart U-shaped brackets.

3. The drainage guide of claim 1, wherein said gutter has two ends, with one end higher than the other end, so as to cause the water to flow downwardly from the higher end to the lower end.

4. The drainage guide of claim 3, wherein said gutter has a higher end near the front of the window panel and said panel slopes downwardly to a lower end near the rear of the window pane.

5. The drainage guide of claim 3, wherein said gutter has a higher end near the rear of the window panel and said panel slopes downwardly to a lower end near the front of the window panel.

6. The drainage guide of claim 1, wherein said gutter has a channel with a flat bottom surface for catching said water.

7. The drainage guide of claim 1, wherein said gutter has a channel with a concave upward surface of catching said water.

8. The drainage guide of claim 1, wherein said vehicle is an automobile; and
   wherein said panel is an automobile safety plate glass window panel.

9. A drainage guide for a vehicle window panel positioned for vertical movement within a door of the vehicle said vehicle door having a belt line seal comprising:
   a vehicle glass window panel;
   a water drip gutter adhesively affixed to said window panel outside window surface for guttering water than collects and passes below the belt line sill of a vehicle door cavity, within said cavity for the useful function of directing the movement of said water to a lower corner of the window panel; and
   said gutter comprises an elastomeric material extruded onto said outside window surface;
   said elastomeric material being extruded onto said outside window surface and being applied prior to said glass panel being installed into said vehicle door cavity or said elastomeric material extruded onto said outside surface after said window panel has been installed into said vehicle door cavity; and
   said butter being independent from any means for mounting the glass window panel within the vehicle door.

* * * * *